(No Model.)
T. A. EDISON.
SYSTEM OF ELECTRICAL DISTRIBUTION.
No. 369,439. Patented Sept. 6, 1887.
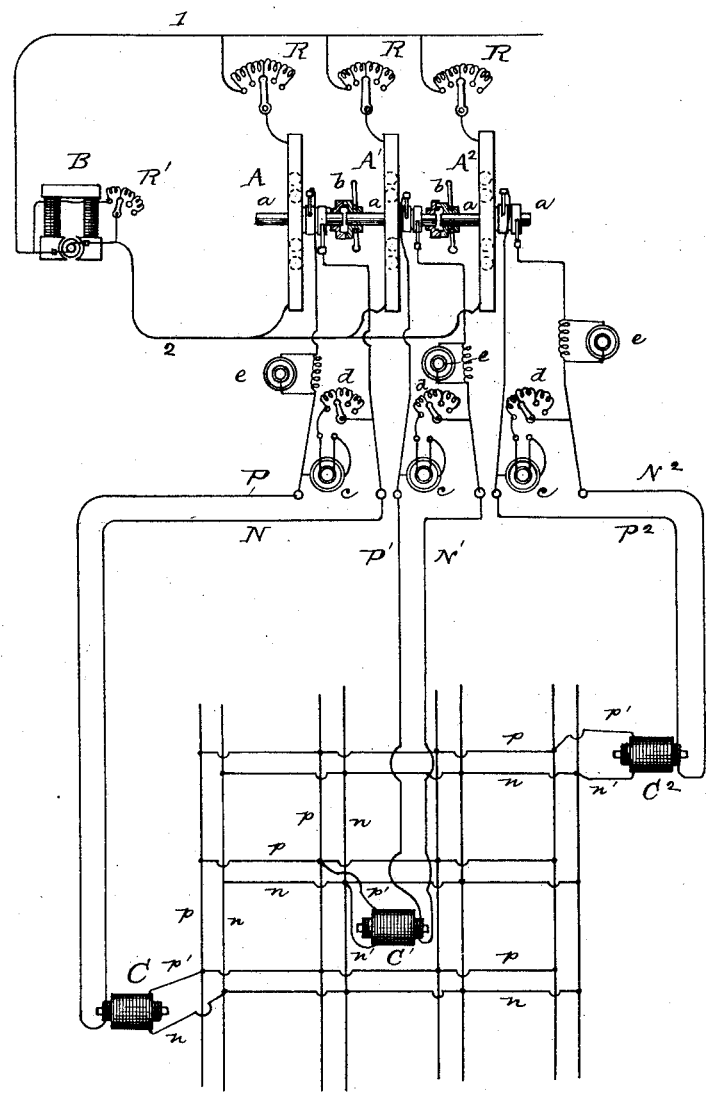

UNITED STATES PATENT OFFICE.

THOMAS A. EDISON, OF LLEWELLYN PARK, NEW JERSEY.

SYSTEM OF ELECTRICAL DISTRIBUTION.

SPECIFICATION forming part of Letters Patent No. 369,439, dated September 6, 1887.

Application filed December 6, 1886. Serial No. 220,795. (No model.)

*To all whom it may concern:*

Be it known that I, THOMAS A. EDISON, of Llewellyn Park, in the county of Essex and State of New Jersey, have invented a certain new and useful Improvement in Systems of Electrical Distribution, (Case No. 694,) of which the following is a specification.

My invention relates to that class of systems for the distribution of electricity in which a source of current of high tension is employed, situated at a distance from the place or district to be supplied, and converters or tension-reducing devices are used to reduce the tension of the current to that at which it is to be used for lighting or other domestic or business purposes, whereby economy is obtained in the amount of metal required for conductors, since the conductors leading from the source have to convey only the current of very high tension.

Said invention relates, mainly, to a novel arrangement of the generators at the source of supply, whereby current of equal and constant potential is given to all parts of the district supplied, and the indication and regulation of such current for the purpose of maintaining such constant and equal potentials is readily and conveniently performed.

In carrying my invention into effect I employ as a source of supply two or more alternating-current dynamo-electric machines having their armatures all mounted upon the same shaft or all mechanically connected together, and preferably having all their field-magnets energized from the same source and arranged to be regulated either independently or simultaneously. From each of these generators a circuit extends to the district supplied, where preferably is a system of intersecting and connected positive and negative main or lighting conductors, with which the electric lamps, electric motors, or other translating devices are connected, the connection between the circuits from the source and said main or lighting circuits being through converters or tension-reducing devices, which, since alternating generators are employed, may be simple induction-coils, and which convert the generated current of high tension to currents of low tension adapted for use in the translating devices. Each generator-circuit is provided with suitable indicating devices, according to whose indications the generators are regulated. I prefer to have the generator-armatures connected by suitable clutches, whereby one or more of them may be thrown out of use when desired.

My invention is illustrated in the accompanying drawing, which is a diagram of a system of electrical distribution embodying said invention.

A, A', and A² represent alternating-current dynamo-electric machines producing high-tension currents, and of which any suitable number may be provided.

B is a continuous-current dynamo-electric machine, from which a circuit, 1 2, extends, and the field-magnets of each alternating machine are connected in derived circuit across the circuit 1 2, each derived circuit including an adjustable resistance, R, whereby the strength of each field-magnet is regulated independently.

The energizing-generator B has a resistance, R', in its field-circuit, whereby the field-magnets of all the alternating machines are regulated simultaneously.

The rotating armatures of the machines A, A', and A² are placed upon shafts $a\ a$, which are provided with suitable locking-clutches, $b\ b$, for coupling them together, whereby all the machines are run from the same source of power at the same speed. From the commutator-brushes of each machine extend, respectively, the circuits P N, P' N', and P² N², which are composed of small conductors adapted to convey the high-tension currents. Each of these circuits includes the primary circuit of a tension-reducing induction-coil, C, C', or C², or other tension-reducing converter.

The system of intersecting and connected main or lighting conductors is shown by $p\ n$. These conductors, as will be understood, usually extend in pairs along the streets of the district, and are connected like to like wherever they meet at the street intersections.

From the secondary circuit of each induction-coil conductors $p'\ n'$ extend, which are connected with the system of lighting-conductors, usually at centers of consumption at or near which the converters are placed.

Each of the high-tension circuits is provided with an indicator, $e$, connected across its conductors, and with a resistance, $d$, in circuit with it, whereby the difference in potential of the conductors or the volts of electro-motive force in the circuit is indicated. These indicators are of a character to be used with the alternating current, consisting of two coils in the same circuit, one of which is movable, as is fully shown and described in my application No. 691, Serial No. 220,792. Each circuit also has a similar indicator, $e$, shunted around a resistance, $f$, in one side of the circuit, whereby the ampères of current on said conductor are shown. In accordance with the indications of these devices the regulation of the generators is performed. Each generator is regulated by itself by adjusting the resistance R in its field-circuit, whereby the current on each high-tension circuit is regulated, and the same constant potential is maintained on all the circuits as changes occur in the number of translating devices in circuit in the different parts of the district, while to vary the entire current supplied the resistance R' in the field circuit of continuous-current generator B is adjusted, whereby the field-magnet strength of all the alternating machines is varied simultaneously.

For greater changes in the whole current supplied, one or more machines may be connected or disconnected from the driving-power by means of the clutches $b$.

What I claim is—

1. In a system of electrical distribution, the combination of two or more dynamo-electric machines generating high-tension currents, and having their armatures mechanically joined together, a circuit from each of said machines, a connected system of main or lighting conductors, and tension-reducing converters connected between the high-tension circuits and the lighting-conductors, reducing the tension of the current, substantially as set forth.

2. In a system of electrical distribution, the combination of two or more dynamo-electric machines generating currents of high tension, having their armature-shafts detachably locked together, a circuit from each of said machines, a connected system of main or lighting conductors, and tension-reducing converters connected between the high-tension circuits and said main or lighting circuits for reducing the tension of the current, subtantially as set forth.

3. In a system of electrical distribution, the combination of two or more alternating-current dynamo-electric machines generating currents of high tension, and having their armatures mechanically joined together, a continuous-current dynamo-electric machine energizing the field-magnets of all said alternating machines, a circuit extending from each of said alternating machines, a system of connected main or lighting conductors, and tension-reducing converters connected between the high-tension circuits and the lighting-circuits for reducing the tension of the current, substantially as set forth.

4. In a system of electrical distribution, the combination of two or more alternating-current dynamo-electric machines generating currents of high tension and having their armatures mechanically connected together, a circuit extending from each of said machines, a system of connected lighting-conductors, tension-reducing converters connected between the high-tension circuits and the lighting-conductors, and means for regulating the electro-motive force of each of said generators, substantially as set forth.

5. In a system of electrical distribution, the combination of two or more alternating-current dynamo-electric machines generating currents of high tension, and having their armatures mechanically connected together, a circuit extending from each of said machines, a system of connected lighting-conductors, tension-reducing converters connected between said high-tension circuits and said lighting-circuits, means for regulating the electro-motive force of each of said generators separately, and means for regulating them all simultaneously, substantially as set forth.

6. In a system of electrical distribution, the combination of two or more dynamo-electric machines generating high-tension currents, and having their armatures mechanically joined together, a circuit from each of said machines, translating devices supplied from all said circuits in common, and tension-reducing converters connected between the high-tension circuits and the translating devices, substantially as set forth.

This specification signed and witnessed this 22d day of November, 1886.

THOS. A. EDISON.

Witnesses:
WM. PEZER,
E. C. ROWLAND.